United States Patent [19]

Cavalli

[11] Patent Number: 4,577,532

[45] Date of Patent: Mar. 25, 1986

[54] AUTOMATIC DEVICE FOR ADVANCEMENT OF REVOLVING MECHANICAL ORGANS

[75] Inventor: Walter Cavalli, Villanova di Castenaso, Italy

[73] Assignee: O.M.C. s.n.c. di Walter & Dante Cavalli, Villanova di Castenaso, Italy

[21] Appl. No.: 612,920

[22] Filed: May 22, 1984

[30] Foreign Application Priority Data

May 30, 1983 [IT] Italy ................................ 3443 A/83

[51] Int. Cl.[4] ............................................. F16H 35/00
[52] U.S. Cl. ........................................ 74/841; 408/80; 408/82; 408/137; 409/179
[58] Field of Search ...................... 74/841; 408/79, 80, 408/81, 82, 129, 137, 146; 409/175, 179, 185; 30/94, 96

[56] References Cited

U.S. PATENT DOCUMENTS

| | | | |
|---|---|---|---|
| 1,038,914 | 9/1912 | Long | 408/82 |
| 1,473,995 | 11/1923 | Long | 408/137 |
| 1,859,547 | 5/1932 | Young | 408/137 |
| 2,993,418 | 7/1961 | Doane | 408/80 |
| 3,421,492 | 1/1969 | Brown | 408/80 |

4,172,146  11/1979  Walker et al. ................. 409/179

*Primary Examiner*—Larry I. Schwartz
*Assistant Examiner*—David W. Westphal
*Attorney, Agent, or Firm*—Collard, Roe & Galgano

[57] ABSTRACT

A device for automatic advance of a rotating tool towards a workpiece, which includes a rotating tool holder for holding a cutting tool for operation on the workpiece. A gear wheel bears against the rotating tool holder which forces it toward the workpiece. A holder is provided to secure the gear wheel with respect to the workpiece. A device associated with the rotating tool holder engages the gear wheel and rotates it as the tool holder rotates. Associated with the holder and the gear wheel is a mechanism for advancing the gear wheel towards the workpiece as the gear wheel rotates. A stop motion apparatus associated with the gear wheel and the rotating tool holder is included for stopping the rotational movement of the gear wheel. The stop motion apparatus consists of a non-rotatable cam which operates on the cam follower to disengage it from the gear wheel, stopping the rotating movement thereof during a segment of the rotation of the tool holder.

5 Claims, 5 Drawing Figures

AUTOMATIC DEVICE FOR ADVANCEMENT OF REVOLVING MECHANICAL ORGANS

This invention relates to an automatic device for advancement of revolving mechanical organs. More particularly, it relates to an automatic device consisting of an advancement mechanism which transforms the motion of a revolving body or tool into a linear advancement motion of the same.

BACKGROUND OF THE INVENTION

A variety of machine tools such as milling machines, drills, tap wrenches, diestocks, and other manual tools, require a revolving cutting motion in combination with an advancement motion. Although the present invention relates to an automatic device for linear advancement which may be applied to any kind of mechanical component that has a revolving motion, for the sake of clarity and simplicity, the device will be described herein as applied to a diestock or tool holder. A diestock requires the operator to provide rotary motion, and also advancement motion. As the tool is operated by hand, it is difficult for the operator to attain the uniformity of pressure and advancement, needed to obtain a cutting surface which is prefectly perpendicular to the axis of rotation of the piece being machined. Therefore, use of a diestock on work involving greater precision than that provided manually by the operator, has required that an automatic advancement device which makes use of a rotary cutting motion supplied manually by the operator, be attached to and used with the diestock.

Accordingly, it is an object of the present invention to provide an automatic device for advancement of revolving mechanical elements, such as cutting tools and the like, which supplies a uniform precision advancement, driven only by rotary motion.

It is also an object of the invention to provide such an automatic device which is of simple and economical construction, easy to use and install, and which is reliable in operation.

SUMMARY OF THE INVENTION

Certain of the foregoing and related objects are readily attained in a device for automatically advancing a rotating tool, with the device including a cutting tool and a rotating tool holder, for holding the cutting tool during operation on a workpiece. A gear wheel is secured in a fixed position with respect to the workpiece and bears against the rotating tool holder, forcing the tool holder against the workpiece. The rotating tool holder includes means for engaging the gear wheel and rotating it, as the tool holder is rotated. A mechanism, such as a screw thread, is provided for advancing the gear wheel towards the workpiece, as the gear wheel is rotated. In addition, a non-rotatable cam operates on the gear engaging means associated with the rotating tool holder to disengage the gear engaging means from the gear wheel, thereby stopping the rotating movement of the gear wheel, during a segment of rotation of the tool holder.

Preferably, the gear engaging means includes a latch which is radially moveable with respect to the gear wheel, for engaging and disengaging it. The latch is integral with a radially moveable cam follower engaged with the cam, the latch engaging with and disengaging from the gear wheel, as the cam follower is moved radially by the cam.

It is also desirable that the cam follower and the integral latch be carried by and rotate with the tool holder. In a preferred embodiment of the invention, biasing means are provided for biasing the cam follower towards the cam, and stop means are provided for the latch to hold it from engaging the gear wheel.

Most desirably, the gear wheel is secured into a fixed position with respect to the workpiece by a collet securing the workpiece to an axial pin of the rotating tool. The tool holder is adapted to rotate on and move axially along the pin. The gear wheel and the pin are threadably engaged with the cam being engaged to the pin by means of a longitudinal groove along the pin engaged with a projection on the cam.

As previously stated, the present invention is described herein in an embodiment suitable for use with a diestock. The diestock consists of a tool holder having two maneuvering arms. The cutting tool itself is cylindrical and has internal cutting edges that operate on the outside of the tube or workpiece, which is being machined. The cutting tool is secured into the holder by screws. The tool's axial datum is obtained by sliding the tool onto a pin, which is coaxial with the tube, in such a way that the pin acts as a centering shaft for the tool itself. The invention consists essentially of a gear wheel screwed onto the extreme rear of the pin and a cam disposed in front of the wheel (or stop motion means). A spring latch is fixed to one of the arms and consists of two ratchet pins which are disposed at right angles, and periodically engage the cam and gear wheel as the diestock is turned during machining. The ratchet disposed radially to the cam transmits the revolving motion of the diestock to the gear wheel only when it is engaged into the grooves of the cam. When the radially disposed ratchet is so engaged, it enables the other ratchet disposed perpendicular to it to engage the teeth of the gear wheel causing it to turn incrementally. As the gear wheel turns, it advances via screw threads on the pin and is forced against the cam, which is mounted on the pin, so that it can slide on the pin, but cannot rotate. The cam is thereby forced against the diestock, causing the cutting tool to advance incrementally further into the workpiece. As the number and shape of the cam grooves determine the ratio between rotations and advancement, it is possible to obtain any reduction or advancement ratio desired.

Other objects and features of the present invention will become apparent from the following detailed description considered in connection with the accompanying drawings, which discloses but a single embodiment of the invention. It is to be understood that the drawings are to be used for the purpose of illustration only, and not as a definition of the limits of the invention.

BRIEF DESCRIPTION OF THE DRAWINGS

In the drawings, wherein similar reference characters denote similar elements throughout the several views.

DETAILED DESCRIPTION OF THE DRAWINGS

Figure 1:
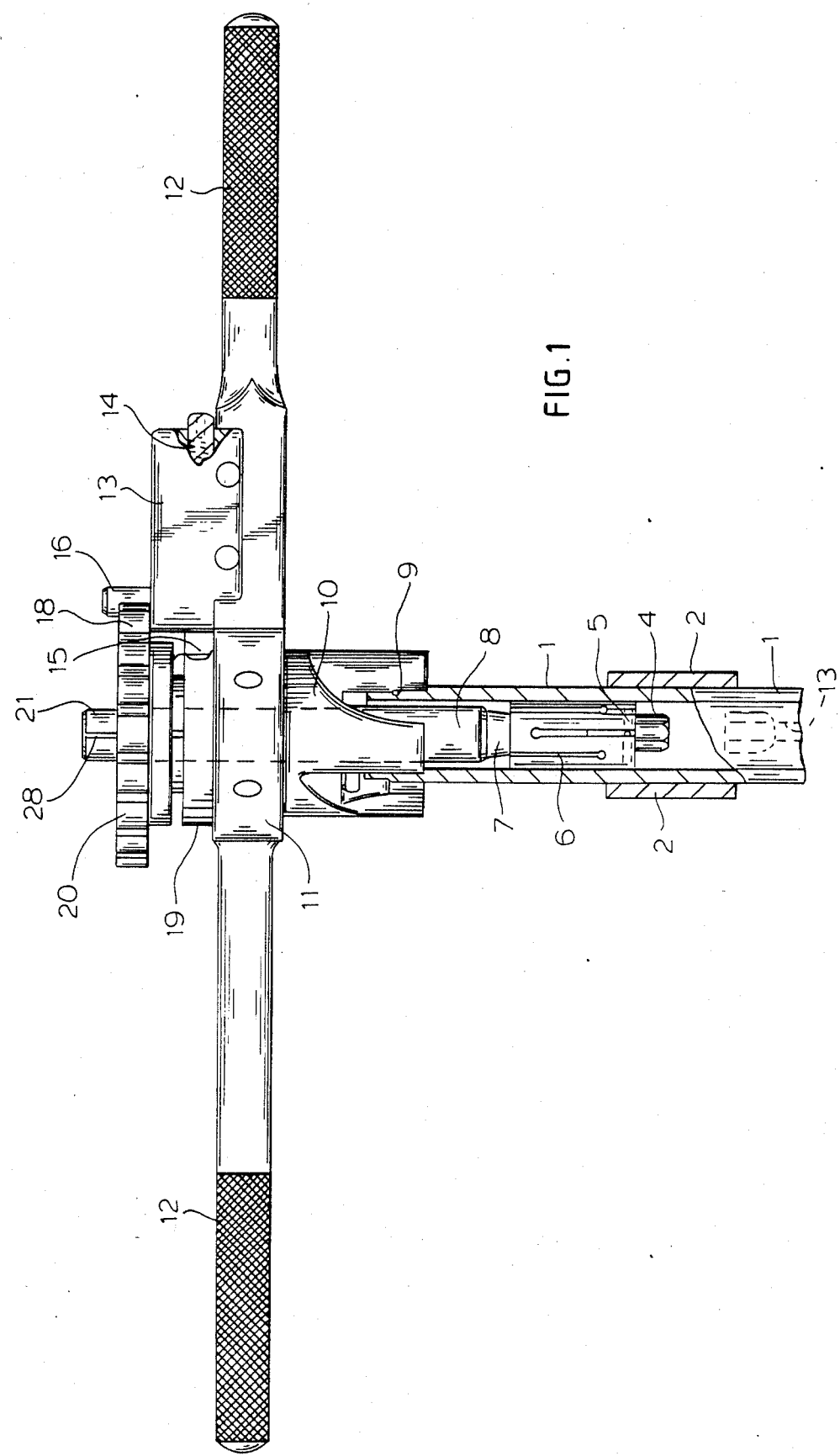
FIG. 1 is a side elevational view partly in cross-section of the automatic device for advancement of revolving mechanical organs, embodying the present invention.
Figure 3:
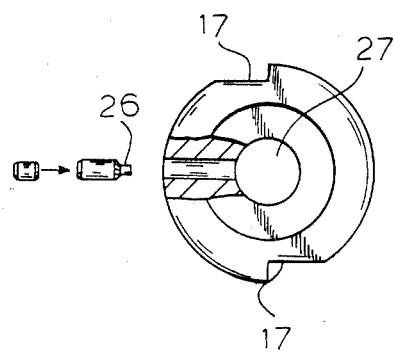
FIG. 3 is a top elevational view partly in cross-section of the cam.

Turning now in detail to the appended drawings, therein is illustrated a novel automatic device for advancement of revolving mechanical elements. As clearly seen in FIG. 1, a clamping vice 2 is clamped around the outside of the tube or workpiece 1 being machined. Disposed adjacent to vice 2 but inside of tube 1 are maneuvering spanner 3 and a maneuvering nut 4, which, through the axial displacement in both directions of the washer 5, controls the expansion and contraction of the collet 6. Collet 6 is fitted onto the tapering part 7 of the locating pin 8 making it possible to axially lock pin 8 into tube 1. The forward part of the tube shown at 9 has already been machined by tool 10 fitted onto the modified diestock 11. Maneuvering arms 12 are turned manually by the operator who supplies the rotary motion. Elastic latch 13, together with the action of spring 14, maintains the engagement of ratchets or cam follower 15 and latch 16 into the respective grooves 17 and 18. Groove 17 is located on cam 19 which is mounted on pin 8 so that the cam can slide axially along pin 8 without being able to rotate. This mounting is achieved by having pin 8 pass through guide bore 27 of cam 19 (FIG. 3). Guide projection 26 protrudes into longitudinal groove 28 of pin 8 (FIG. 5), but it does not actually engage or clamp pin 8.

Groove 18 is located on the external circumference of the gear wheel 20 which bears a continuous series of grooves shaped appropriately for the ratchet or latch 16. Gear wheel 20 is screwed onto threaded part 21 of pin 8, and it is therefore forced to advance on its thread during the period in which the ratchet or latch 16 remains engaged on one of its teeth. This occurs twice during each complete turn of the die as gear wheel 20 advances via its threaded engagement to pin 8, it bears against cam 19 which in turn bears against diestock 11. As a result, cutting tool 10 is forced further towards or into the workpiece, as diestock 11 is rotated.

In the embodiment of the invention shown, the cam grooves are arranged at 180 degrees and so that it is only when ratchet or cam follower 15 fully penetrates one of them that ratchet or latch 16 is engaged with the gear wheel. This action brings about an advancement of 1/10 of a millimeter for each complete turn.

Figure 2:
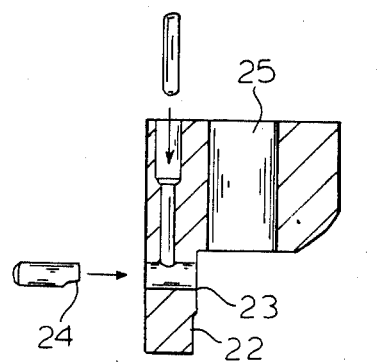
FIG. 2 is a fragmentarily illustrated transverse sectional view of the cutting tool.

As shown in FIG. 2, cutting edges 22 of the milling machine are used for the more superficial machining of the tube. Cutting edges 23 are used for the deeper cycle while cutter 24 is provided for machining the tube's front parting-off section. When assembled, locating pin 8 passes through bore 25 of milling machine or cutter 10.

Figure 4:
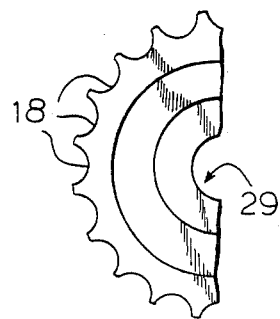
FIG. 4 is a fragmentarily illustrated top elevational view of the gear wheel.

FIG. 4 shows the threaded coupling bore 29 of gear wheel 20 engaged to the threaded part 21 of locating pin 8.

Figure 5:
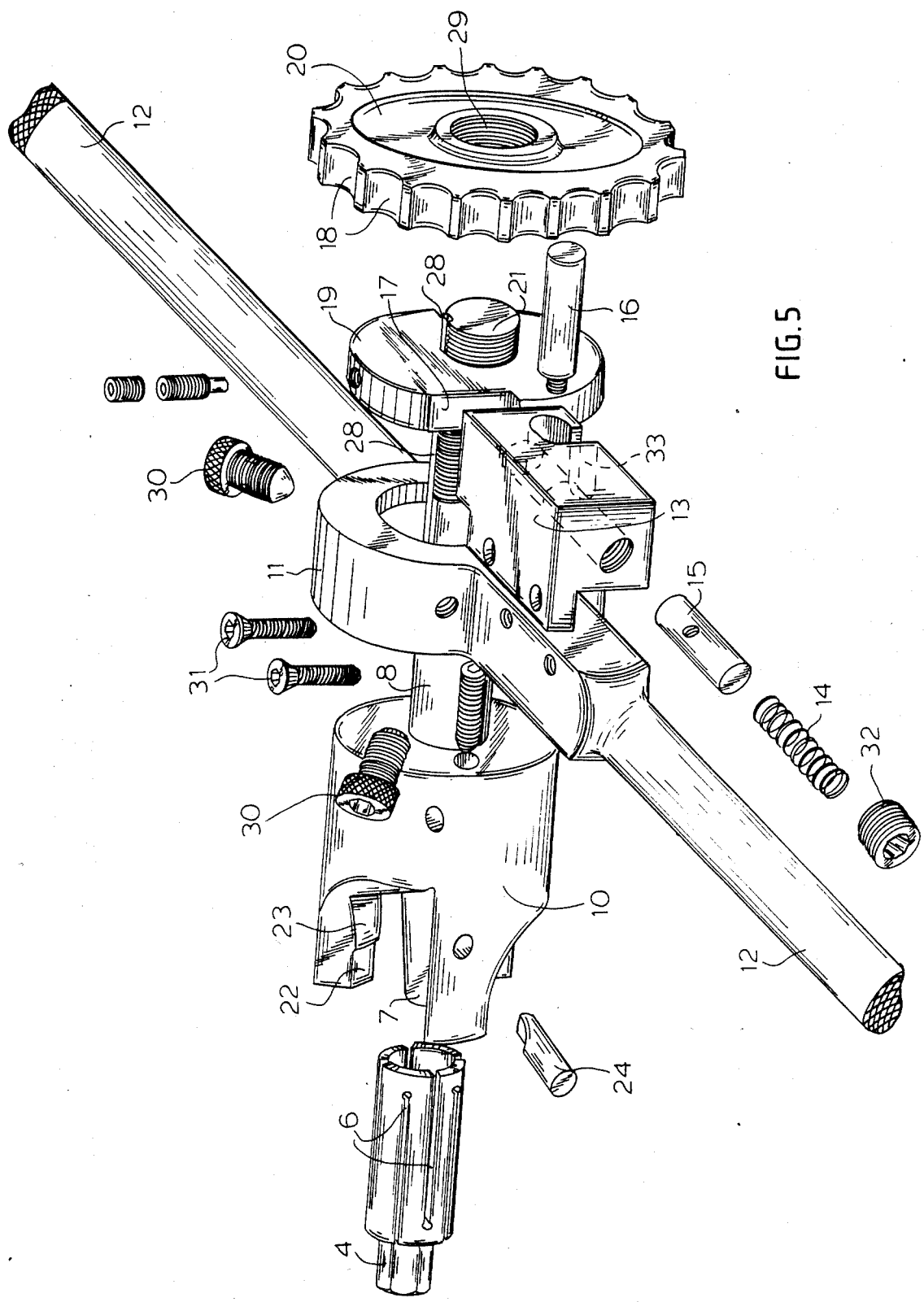
FIG. 5 is an exploded perspective view of the present invention as used with a diestock.

Turning now to FIG. 5 which shows additional details of the present invention, screws 30 are used to lock milling machine or cutter 10 into diestock 11. Elastic latch 13 is fastened to an arm 12 of diestock 11 via screws 31. Compression dowel 22 maintains spring 14 within elastic latch 13 and bore 33 is shaped in such a way as to keep the latch disengaged while the equipment is being set up.

Thus, while only one embodiment of the present invention has been shown and described, it is obvious that many changes and modifications may be made thereunto, without departing from the spirit and scope of the invention.

I claim:

1. A device for automatic advance of a rotating tool towards a workpiece, said tool including a cutting tool, comprising:
    (a) a rotating tool holder for holding said cutting tool for operation on said workpiece;
    (b) a gear wheel bearing against said rotating tool holder toward said workpiece;
    (c) holding means secured to said workpiece for holding said gear wheel with respect to said workpiece;
    (d) means associated with said rotating tool holder for engaging said gear wheel and rotating the same as said tool holder rotates;
    (e) means associated with said holding means and said gear wheel for advancing said gear wheel towards said workpiece as said gear wheel rotates; and
    (f) a stop motion means associated with said gear wheel and said rotating tool holder for stopping the rotational movement of said gear wheel, said stop motion means comprising:
a non-rotatable cam which operates on said gear engaging means associated with said rotating tool holder to disengage said gear engaging means from said gear wheel, stopping the rotating movement thereof during a segment of the rotation of said tool holder.

2. The device for automatic advance of a rotating tool as defined in claim 1, wherein said gear engaging means comprises a latch radially movable with respect to said gear wheel for engaging and disengaging from the same, said latch being integral with a radially movable cam follower engaged with said cam, said latch engaging with and disengaging from said gear wheel as said cam follower is moved radially by said cam.

3. The device for automatic advance of a rotating tool as defined in claim 2, wherein said cam follower and said integral latch are carried by said tool holder and rotate therewith.

4. The device for automatic advance of a rotating tool as defined in claim 3, which further comprises biasing means for biasing said cam follower towards said cam, and stop means for said latch to hold said latch from engagement with said gear wheel.

5. The device for automatic advance of a rotating tool as defined in claim 1, wherein said holding means comprises a collet securing said workpiece to an axial pin of said rotating tool, said tool holder being adapted to rotate on and move axially along said pin, said gear wheel and said pin being threadably engaged, and said cam being engaged with said pin by means of a longitudinal groove along said pin engaged with a projection on said cam.

* * * * *